United States Patent
Iwata (10) Patent No.: US 9,583,138 B2
(45) Date of Patent: Feb. 28, 2017

(54) ACCESSOR AND LIBRARY DEVICE

(71) Applicant: NEC Corporation, Minato-ku, Tokyo (JP)

(72) Inventor: Shinichi Iwata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/993,245

(22) Filed: Jan. 12, 2016

(65) Prior Publication Data

US 2016/0217824 A1 Jul. 28, 2016

(30) Foreign Application Priority Data

Jan. 22, 2015 (JP) ................. 2015-010052

(51) Int. Cl.
| | |
|---|---|
| *G11B 33/02* | (2006.01) |
| *G11B 23/50* | (2006.01) |
| *G11B 33/14* | (2006.01) |
| *G11B 15/68* | (2006.01) |

(52) U.S. Cl.
CPC .............. *G11B 23/50* (2013.01); *G11B 15/68* (2013.01); *G11B 33/022* (2013.01); *G11B 33/1446* (2013.01)

(58) Field of Classification Search
None
See application file for complete search history.

(56) References Cited

U.S. PATENT DOCUMENTS

| | | | | |
|---|---|---|---|---|
| 5,793,714 A | * | 8/1998 | Inoue | G11B 17/221 369/30.34 |
| 2003/0056808 A1 | * | 3/2003 | Randall | B08B 7/0028 134/6 |
| 2005/0195517 A1 | * | 9/2005 | Brace | G11B 15/6835 360/92.1 |
| 2007/0074740 A1 | * | 4/2007 | Aaron | B08B 7/00 134/6 |

FOREIGN PATENT DOCUMENTS

| | | | | |
|---|---|---|---|---|
| JP | H08-235729 A | | 9/1996 | |
| JP | 2000048450 A | * | 2/2000 | |
| JP | 2001002206 A | * | 1/2001 | |
| JP | 2008-226401 A | | 9/2008 | |
| JP | 2013-065367 A | | 4/2013 | |
| JP | 2013065367 A | * | 4/2013 | |
| JP | 2013-084317 A | | 5/2013 | |
| JP | 2013206527 A | * | 10/2013 | |

OTHER PUBLICATIONS

English-machine translation of JP 2013-065367 A to Sugita, published on Apr. 11, 2013.*

* cited by examiner

*Primary Examiner* — Will J Klimowicz (57) ABSTRACT

An accessor includes a main body unit configured to convey a recording medium in a first direction, the main body unit being attached to a housing of a library device to be movable in the first direction, a picker configured to convey the recording medium in a second direction intersecting with the first direction, the picker being mounted on the main body unit to be movable in the second direction, and a cleaner mounted on a surface of the picker along the second direction.

6 Claims, 6 Drawing Sheets

FIRST DIRECTION

SECOND DIRECTION

Fig. 6B

EXAMPLE OF MOVING RANGE OF ACCESSOR 120
AT TIME OF NORMAL OPERATION

ACCESSOR AND LIBRARY DEVICE

This application is based upon and claims the benefit of priority from Japanese Patent Application No. 2015-010052, filed on Jan. 22, 2015, the disclosure of which is incorporated herein in its entirety by reference.

TECHNICAL FIELD

The present invention relates to an accessor and a library device.

BACKGROUND ART

Japanese Patent Application Laid-open Publication No. 08-235729 discloses a library device provided with a cleaning means for cleaning an optical detection means which detects protrusion of a cartridge from a cell.

Japanese Patent Application Laid-open Publication No. 2008-226401 discloses an auto-loader device provided with an accessor mechanism including a conveying mechanism provided with a conveying roller and a cleaning roller for a cartridge medium.

Japanese Patent Application Laid-open Publication No. 2013-84317 discloses a tape library device control system for performing dust cleaning by using a dust cleaning tape for a tape storage rack in an empty state.

Japanese Patent Application Laid-open Publication No. 2013-65367 discloses a library device including a removing means for removing dust on a moving path in a facing area facing a bottom portion of a picker means in association with movement of the picker means.

SUMMARY

A main object of the present invention is to provide an accessor having high reliability, and the like.

An accessor according to an exemplary aspect of the invention includes a main body unit configured to convey a recording medium in a first direction, the main body unit being attached to a housing of a library device to be movable in the first direction, a picker configured to convey the recording medium in a second direction intersecting with the first direction, the picker being mounted on the main body unit to be movable in the second direction, and a cleaner mounted on a surface of the picker along the second direction.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
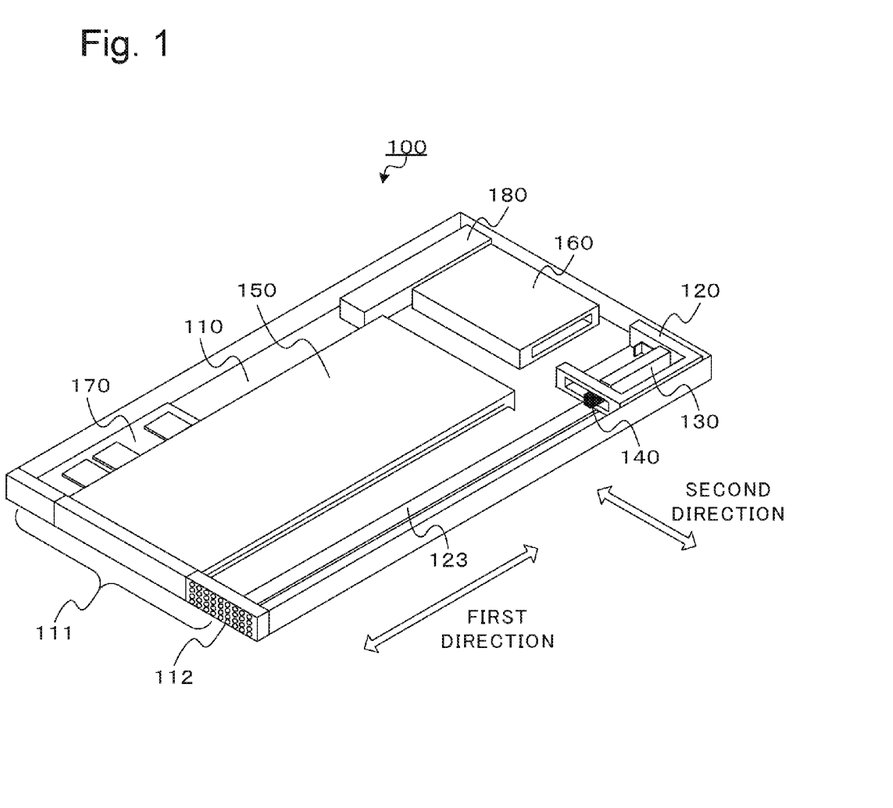
FIG. 1 is a diagram illustrating a configuration of a library device according to a first exemplary embodiment of the present invention.

Next, a detailed explanation will be given for a first exemplary embodiment with reference to the drawings. As illustrated in FIG. 1, a library device 100 according to the first exemplary embodiment of the present invention is provided with an accessor 120, a picker 130, a cleaner 140, a magazine 150, and a drive 160. In addition to the above, the library device 100 according to the exemplary embodiment may be provided with a control unit 170 and a power supply unit 180. The constituent elements are accommodated in a housing 110 including vent holes 112 formed therein.

Next, details with respect to the each element constituting the library device 100 according to the first exemplary embodiment of the present invention will be described.

The accessor 120 is provided in the housing 110 to be movable in a first direction. The first direction is illustrated by the arrow in FIG. 1. In the example illustrated in FIG. 1, the first direction corresponds to the depth direction of the library device 100. The accessor 120 is configured to be conveyable in the first direction while holding a recording medium (not illustrated). A rail 123 and an unillustrated driving mechanism and the like, are provided as necessary so that the accessor 120 is movable in the first direction. The accessor 120 conveys a recording medium between the magazine 150 and the drive 160 by conveying the recording medium in the first direction. Further, the accessor 120 is configured to convey a recording medium between accommodation units provided in the magazine 150. The details of the accessor 120 will be described later.

The picker 130 is provided in the accessor 120. The picker 130 is movable in a second direction illustrated by the arrow in FIG. 1. The picker 130 is configured to convey a recording medium in the second direction while holding the recording medium. The second direction is a direction intersecting with the first direction. In the example illustrated in FIG. 1, the second direction is a direction orthogonal (or substantially orthogonal) to the first direction. An unillustrated driving mechanism is provided as necessary so that the picker 130 is movable in the second direction. The picker 130, by conveying the recording medium in the second direction, picks up the recording medium from the magazine 150 or the drive 160, or put the recording medium into the magazine 150 or the drive 160.

The magazine 150 accommodates a plurality of recording media. For instance, the recording media (not illustrated) are magnetic tapes compliant to a certain standard. The recording media may be other types of media, like optical discs. As one example, the magazine 150 may be provided with an arbitrary number of accommodation units depending on the shape or the size of the recording media. The drive 160 records or reads information with respect to the recording media. When the recording media are magnetic tapes, the drive 160 is a magnetic tape drive.

In the library device 100 according to the exemplary embodiment, the magazine 150 and the drive 160 may be disposed along the first direction. Further, the magazine 150 may be configured to accommodate a plurality of recording media along the first direction. According to such a configuration, it is possible for the accessor 120 to convey recording media between the magazine 150 and the drive 160, and to convey the recording media between the accommodation units provided in the magazine 150.

The control unit 170 controls operations of the accessor 120, the picker 130, and the drive 160, and the like. While controlling the operation of each of the constituent elements as described above, the control unit 170 may monitor the operation of each of the constituent elements, or perform other operations. Further, the power supply unit 180 supplies electric power necessary for operating each of the constituent elements to each of the constituent elements described above.

As described above, the constituent elements are accommodated in the housing 110. Further, the vent holes 112 are formed on at least one of the side surfaces of the housing 110. In the example illustrated in FIG. 1, the vent holes 112 are formed on a surface where a front bezel 111 of the housing 110 is provided. The second direction described above coincides with the extending direction of the front bezel 111 of the housing 110 including the vent holes 112.

Figure 2:
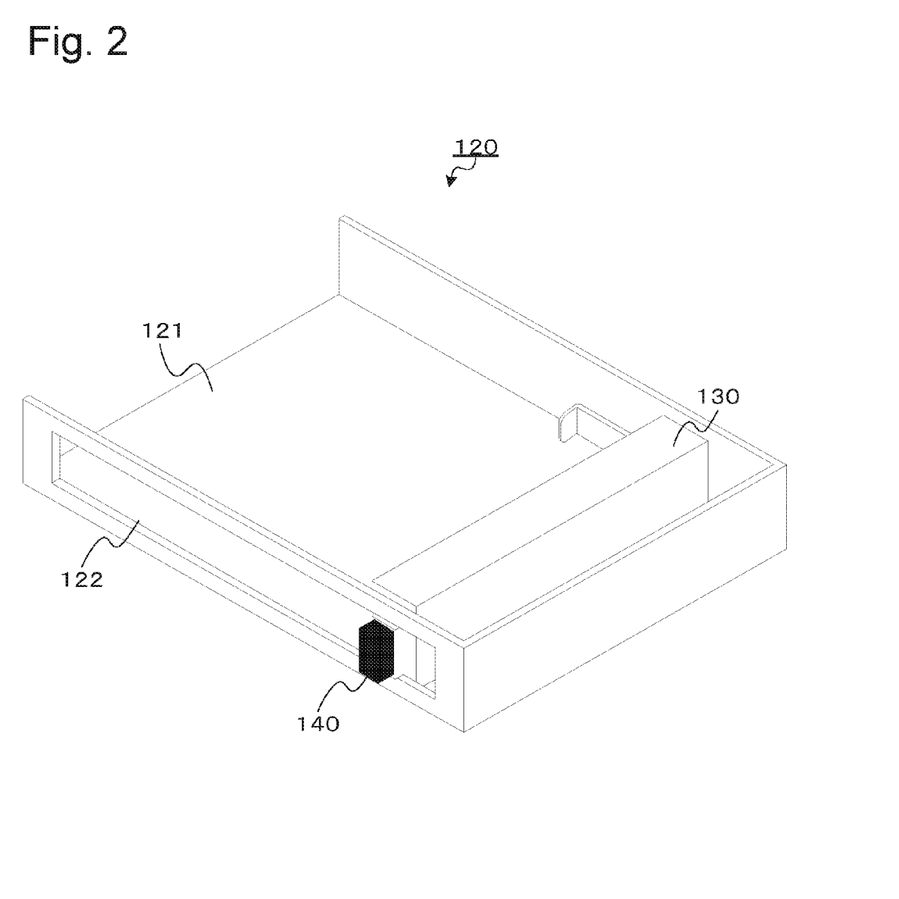
FIG. 2 is a diagram illustrating a configuration of an accessor included in the library device according to the first exemplary embodiment of the present invention.

Next, by using FIG. 2, a configuration example relating to the accessor 120 of the library device 100, and the like, according to the first exemplary embodiment of the present invention is described in details. Note that in the drawing of FIG. 2 and other relevant drawings, the cleaner 140 is illustrated as a black rectangular parallelepiped member, in order to simplify the description. An exemplified structure of the cleaner 140 will be described later.

In the configuration example, an opening portion 122 is formed on a surface of a main body unit 121 of the accessor 120. In the library device 100, the accessor 120 is disposed at such a position that the surface of the main body unit 121 including the opening portion 122 faces the vent holes 112 or a filter 113 when the main body unit 121 is properly moved in the first direction.

Further, the picker 130 is disposed inside the main body unit 121 of the accessor 120 to be movable in the second direction. The cleaner 140 is mounted on at least one of the surfaces of the picker 130. The surface where the cleaner 140 is mounted is a side surface of the picker 130. In other words, the cleaner 140 is mounted on a surface of the picker 130 that is extending in the second direction. The second direction is the direction along which the picker 130 is moved.

The picker 130 is disposed in the accessor 120 in such a manner that the surface of the picker 130 where the cleaner 140 is mounted, and the surface of the main body unit 121 where the opening portion 122 is formed face the same direction. In other words, the picker 130 is disposed at such a position that at least a part of the cleaner 140 faces the outside (the side opposite to the area where the accessor 120 and the picker 130 hold a recording medium) of the main body unit 121 of the accessor 120 through the opening portion 122. In the configuration, the cleaner 140 may be disposed in such a manner that at least a part of the cleaner 140 is located on the outside of a side surface of the main body unit 121. In other words, the cleaner 140 is mounted on the picker 130 so that a part of the cleaner 140 protrudes from a surface of the main body unit 121 (in the example of FIG. 2, a surface serving as a side surface of the main body unit 121) through the opening portion 122 formed in the main body unit 121 of the accessor 120. The accessor 120 is disposed in the housing 110 in such a manner that the surface of the main body unit 121 including the opening portion 122 faces the vent holes 112 or the filter 113. Thus, the cleaner 140 is disposed to face the vent holes 112 or the filter 113.

In the configuration example, the cleaner 140 is composed of a brush. In this instance, the cleaner 140 may be a nylon brush configured such that nylon fibers in the form of a toothbrush are put together or implanted for removing dust such as cotton dust. In this case, a plurality of the nylon fibers constituting a nylon brush are arranged so that the root portion of the nylon brush forms a rectangular shape. Alternatively, the cleaner 140 may be made of non-woven fabric or sponge, for example. It is often the case that dust remaining in the vent holes 112 or in the filter 113 (described later) is dust such as cotton dust. In view of the above, the cleaner 140 may be made of an arbitrary material or may have an arbitrary structure which are capable of removing dust such as cotton dust.

Figure 3:
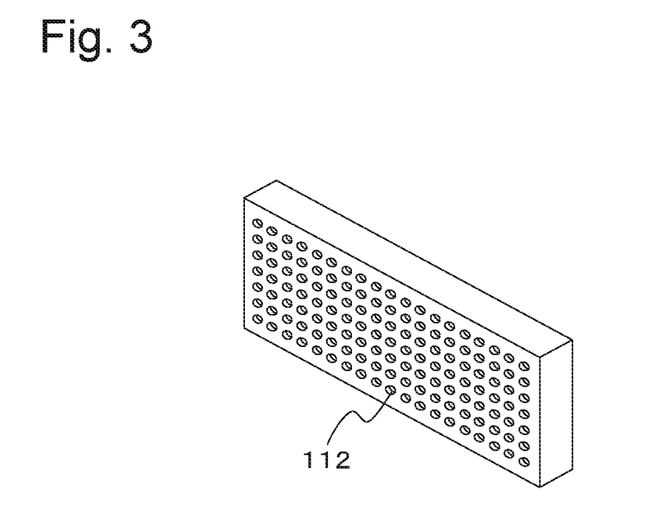
FIG. 3 is a diagram illustrating a configuration example of an opening portion included in the library device according to the first exemplary embodiment of the present invention.
Figure 4:
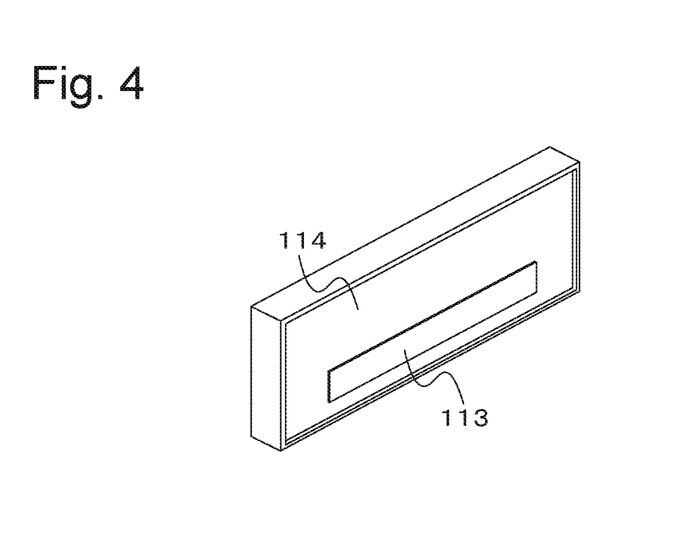
FIG. 4 is a diagram illustrating a configuration example of the opening portion included in the library device according to the first exemplary embodiment of the present invention.

Next, details of a configuration example relating to the vent holes 112 of the library device 100 according to the first exemplary embodiment of the present invention are described by using FIG. 3 and FIG. 4. FIG. 3 is a diagram illustrating the vent holes 112, and FIG. 4 is a diagram illustrating a surface opposite to the surface including the vent holes 112 illustrated in FIG. 3.

As described above, the vent holes 112 are formed in the front bezel 111 of the housing 110. In the configuration example, as illustrated in FIG. 4, the filter 113 is provided on the surface of the housing 110 facing the inside of the housing 110 with respect to the vent holes 112 (in other words, a surface facing the accessor 120 and the picker 130, and the like). A cover 114 is formed around the filter 113. The filter 113 and the cover 114 are disposed in parallel to (or in substantially parallel to) the surface including the vent holes 112, for example. Thus, the direction along which the vent holes 112 and the filter 113 are provided coincides with a direction in parallel to (or in substantially parallel to) the moving direction of the cleaner 140. The periphery of the filter 113 is sealed since the cover 114 is provided. The air passing through the vent holes 112 passes through the filter 113. According to this configuration, most of the dust contained in the air passing through the vent holes 112 are trapped by the filter 113. In other words, it is possible to prevent intrusion of dust into the housing 110.

However, when dust is accumulated in the filter 130, a flow of the air passing through the filter 113 decreases. Thus, the filter 130 needs to be cleaned. The cleaner 140 cleans the filter 113.

The filter 113 is made of an arbitrary material suitable for trapping the dust in the air. Further, the size of the filter 113 is determined depending on the size of the cleaner 140, or the moving range of the cleaner 140 (That is, the moving range of the picker 130).

Figure 5A:
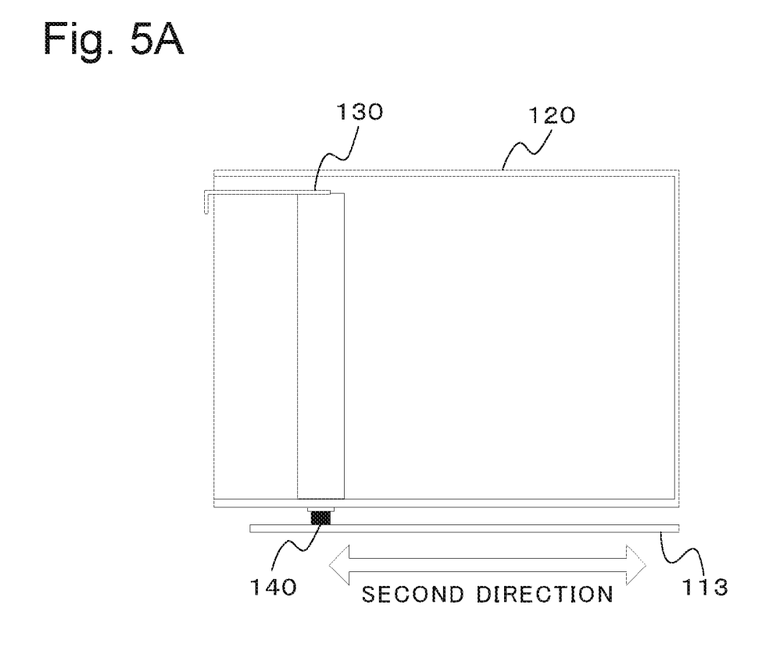
FIG. 5A is a diagram illustrating an example of an operation of a picker and a cleaner included in the library device according to the first exemplary embodiment of the present invention.
Figure 5B:
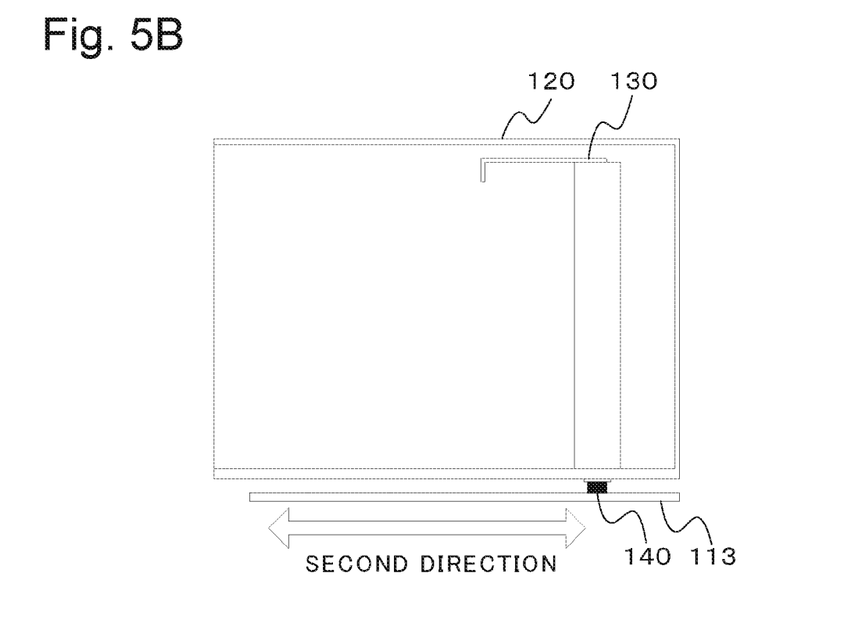
FIG. 5B is a diagram illustrating another example of an operation of the picker and the cleaner included in the library device according to the first exemplary embodiment of the present invention.

Next, by using FIG. 5A and FIG. 5B, an operation of the picker 130 and the cleaner 140 included in the library device 100 according to the first exemplary embodiment of the present invention is described. FIG. 5A is an example where the picker 130 and the cleaner 140 has approached to one side of the accessor 120. FIG. 5B is an example where the picker 130 and the cleaner 140 has moved and approached to the other side of the accessor 120.

As described above, the picker 130 is provided in the accessor 120 to be movable in the second direction. As illustrated in FIG. 2, when the cleaner 140 is mounted on a surface of the picker 130 (a side surface of the picker 130) along the second direction, the cleaner 140 is moved in response to the movement of the picker 130 in the second direction.

In addition, an end of the cleaner 140 is formed to protrude to the outside from the accessor 120 through the opening portion 122 formed in the main body unit 121 of the accessor 120 as described above. Thus, it is possible to bring the cleaner 140 into contact with the other constituent elements. The contact of the cleaner 140 with the other constituent elements makes it possible to clean the other constituent elements in response to the movement of the picker 130 in the second direction. In other words, moving the accessor 120 to such a position that the cleaner 140 comes into contact with the filter 113, and properly moving the picker 130 in the second direction allow the cleaner 140 to clean the filter 113 and the like.

Next, referring to FIG. 6A to FIG. 7B, an operation of the accessor 120 and the picker 130 included in the library device 100 according to the first exemplary embodiment of the present invention is described. In FIG. 6A to FIG. 7B, description of the constituent elements unnecessary for describing the operation of the accessor 120 and the picker 130 is omitted.

In the exemplary embodiment, the accessor 120 and the picker 130 perform two operations, i.e. an operation of conveying a recording medium (hereinafter called as a "normal operation"), and an operation of cleaning the filter 113 (hereinafter called as a "cleaning operation").

Figure 6A:
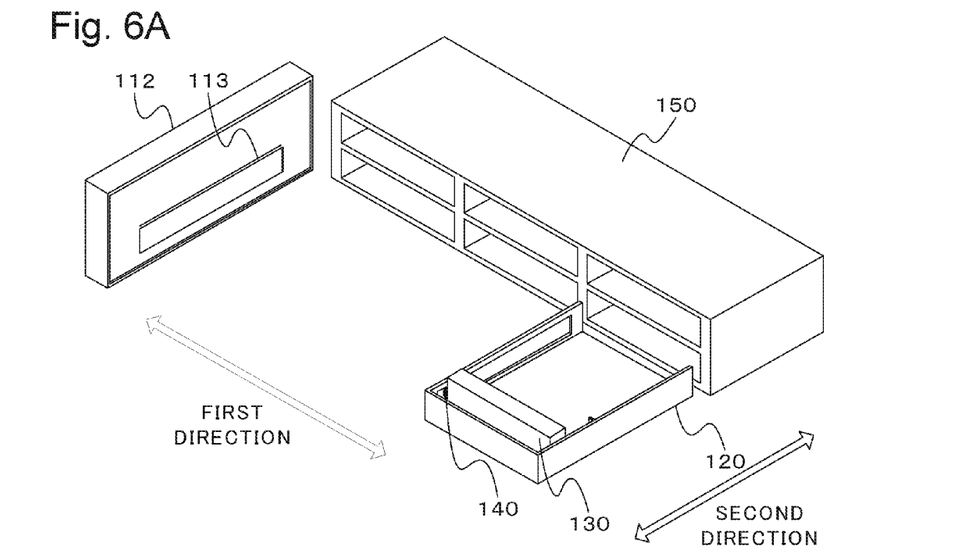
FIG. 6A is an isometric view illustrating an example of an operation of the accessor and the picker included in the library device at the time of a normal operation according to the first exemplary embodiment of the present invention.

The normal operation is an operation relating to reading and writing with respect to a recording medium by the accessor 120 and the picker 130. That is, as illustrated in FIG. 6A, the accessor 120 and the picker 130 convey a recording medium between the magazine 150 and the drive 160.

Figure 6B:
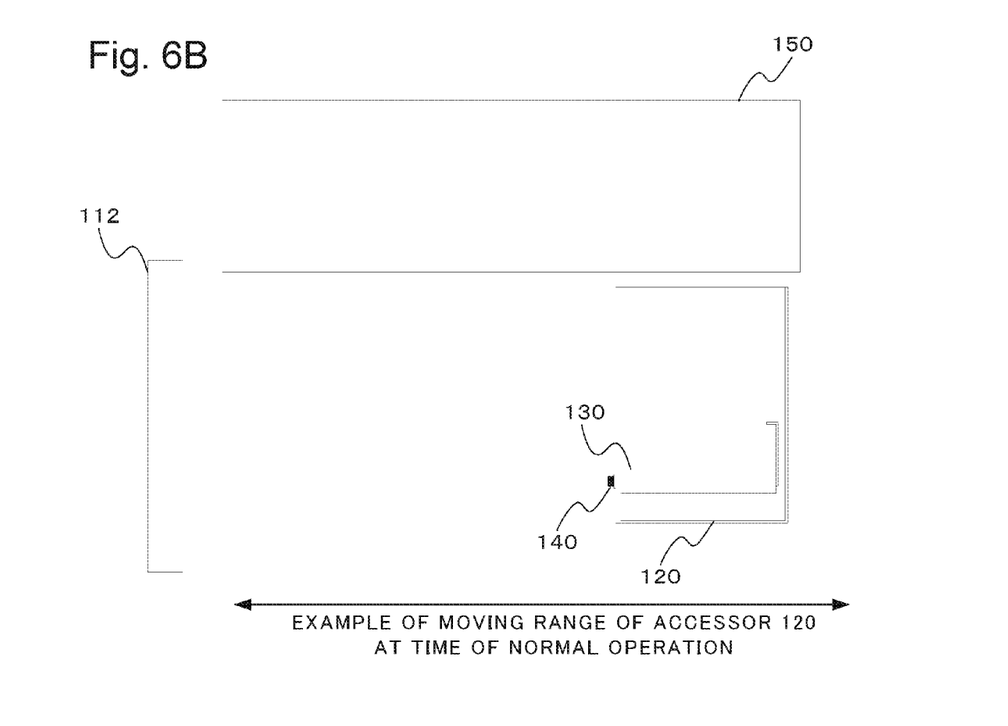
FIG. 6B is a top view illustrating an example of an operation of the accessor and the picker included in the library device at the time of a normal operation according to the first exemplary embodiment of the present invention.

When the normal operation is performed, as illustrated in FIG. 6B, for instance, the accessor 120 is moved along the first direction in the area facing the area where the magazine 150 and the drive 160 are provided. Note that although the drive 160 is not illustrated in FIG. 6A and FIG. 6B, the accessor 120 is also movable to the area facing the area where the drive 160 is provided. In other words, the accessor 120 and the picker 130 are moved in such a manner that the cleaner 140 does not come into contact with an element to be cleaned such as the filter 113.

The cleaning operation is an operation of cleaning the filter 113 and other element to be cleaned by the accessor 120 and the picker 130. In the exemplary embodiment, when a cleaning operation is performed, it is preferably assumed that the accessor 120 and the picker 130 do not perform conveying of a recording medium.

Figure 7A:
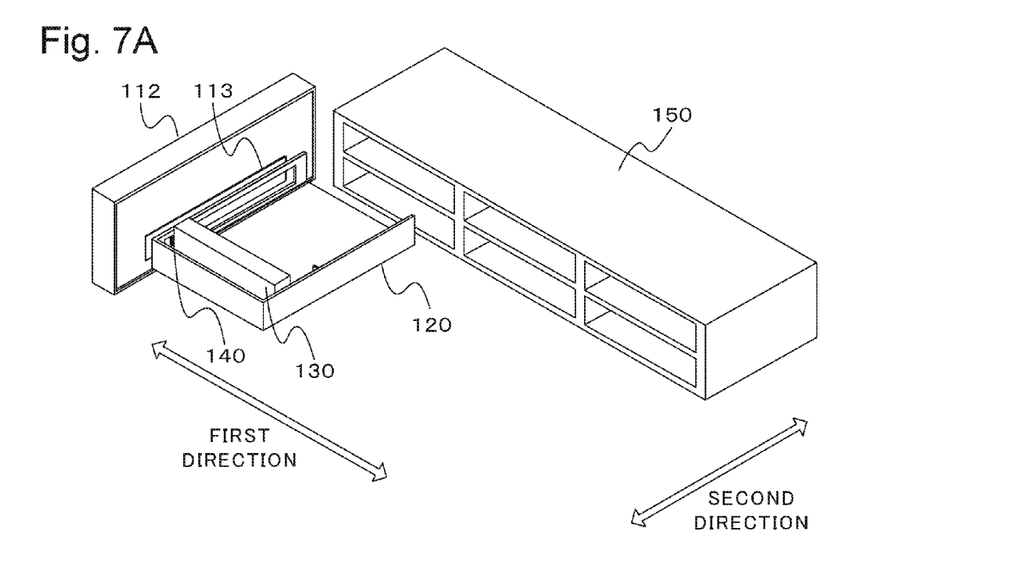
FIG. 7A is an isometric view illustrating an example of an operation of the accessor and the picker included in the library device at the time of a cleaning operation according to the first exemplary embodiment of the present invention.
Figure 7B:
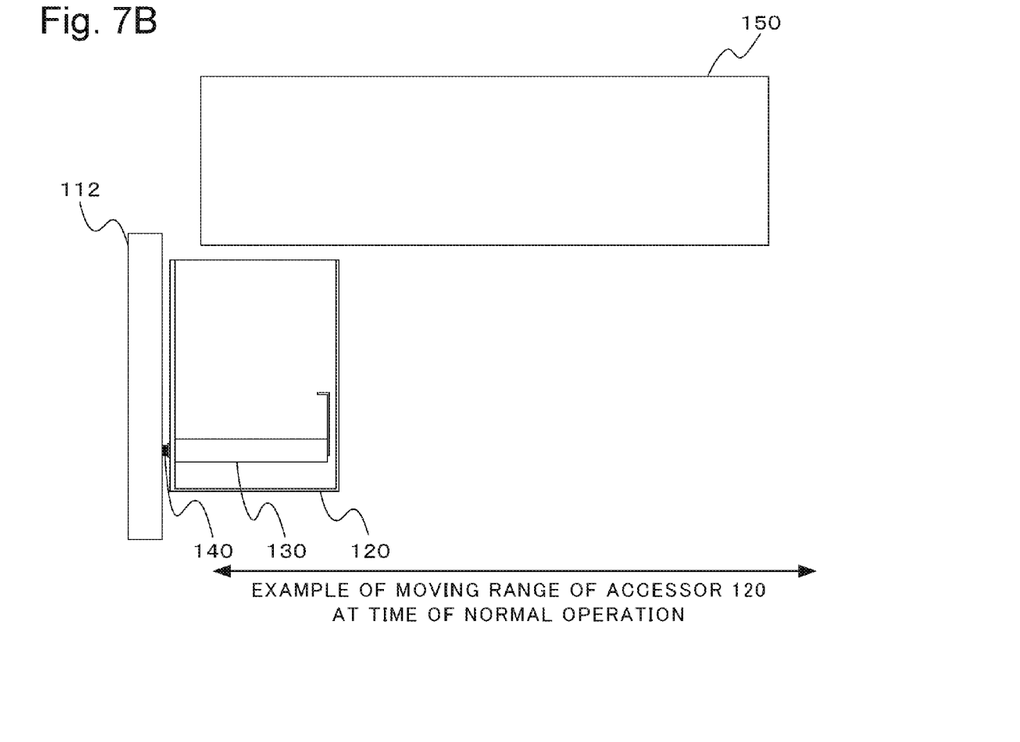
FIG. 7B is a top view illustrating an example of the operation of the accessor and the picker included in the library device at the time of a cleaning operation according to the first exemplary embodiment of the present invention.

When the cleaning operation is performed, as illustrated in FIG. 7B, for instance, the accessor 120 is moved along the first direction in such a manner that the accessor 120 is moved beyond the area where the magazine 150 and the drive 160 are provided (That is, the area where the accessor 120 is moved at the time of the normal operation), and that the accessor 120 approaches the front bezel 111. In other words, as illustrated in FIG. 7A, the accessor 120 is moved along the first direction to such a position that the end of the cleaner 140 comes into contact with the filter 113. The filter 113 is cleaned by moving the picker 130 along the second direction in a state that the cleaner 140 and the filter 113 are in contact with each other.

In other words, at the time of the cleaning operation, the filter 113 is cleaned by the cleaner 140 in response to the movement of the picker 130 in the second direction. According to the configuration, the filter 113 is effectively cleaned when the size of the filter 113 is determined in accordance with the size of the cleaner 140 or the moving range of the cleaner 140.

In other words, as far as the height of the filter 113 is equal to the height of the cleaner 140, and as far as the length of the filter 113 is equal to the moving range of the cleaner 140 in the second direction, substantially the whole area of the filter 113 is cleaned by the cleaner 140. In the configuration, the height of the cleaner 140 may be larger than the height of the filter 113, and the moving range of the cleaner 140 in the second direction may be larger than the length of the filter 113. Note that in each of the drawings, the height of the filter 113 corresponds to the vertical size of the filter 113, and the length of the filter 113 corresponds to the size of the filter 113 in the second direction.

As described above, in the library device 100 according to the exemplary embodiment, the filter 113 in the vent holes 112 is cleaned by the operation of the accessor 120 and the picker 130. In other words, in the library device 100 according to the exemplary embodiment, an additional driving mechanism for cleaning the filter 113 is not necessary. In other words, it is possible to simplify the configuration of the library device 100 according to the exemplary embodiment.

Further, as described above, in the library device 100 according to the exemplary embodiment, a normal operation of conveying a recording medium, and a cleaning operation can be performed at different timings. In other words, it is possible to clean the filter 113 without exerting a load on an unillustrated driving mechanism of the accessor 120 and the picker 130 by concurrently performing an operation of conveying a recording medium and a cleaning operation. In other words, the library device 100 according to the exemplary embodiment is advantageous in enhancing reliability regarding the operation of the accessor 120 and the picker 130.

As described above, in the library device 100 according to the first exemplary embodiment of the present invention, the cleaner 140 is mounted on the picker 130 provided in the accessor 120. It is possible to clean the vent holes 112 or the filter 113 by the cleaner 140 by properly moving the accessor 120 and the picker 130 in the first direction and in the second direction, respectively.

In the library device 100 according to the first exemplary embodiment of the present invention, it is not necessary to provide a driving mechanism such as an actuator dedicatedly used for cleaning. Thus, it is possible to manufacture the library device 100 according to the first exemplary embodiment of the present invention at a low cost.

Furthermore, it is possible to prevent the temperature inside the housing 110 from increasing by cleaning the vent holes 112 or the filter 113 by the cleaner 140, because a flow of an air passing through the vent holes 112 or the filter 113 will be kept.

Therefore, it is possible to configure the library device 100 according to the first exemplary embodiment of the present invention as a library device 100 having high reliability.

Modified Example of First Embodiment

Various modifications are applicable to the library device 100 according to the exemplary embodiment.

In the first exemplary embodiment described above, the accessor 120 and the picker 130 in the library device 100 are configured to perform two operations, i.e. a normal operation and a cleaning operation. The accessor 120 is configured to move toward the vent holes 112 beyond the movable range of the accessor 120 at the time of a normal operation so as to perform cleaning at the time of a cleaning operation. However, the accessor 120 may not perform the aforementioned two operations. For instance, the positional relationship between the movable range of the accessor 120 and the vent holes 112 may be determined in such a manner that a cleaning operation is performed during a normal operation.

In the configuration, it is configured such that the cleaner 140 and the filter 113 come into contact with each other when the accessor 120 is moved to a position close to the vent holes 112 when an operation of conveying a recording medium is performed as a normal operation of the library device 100. Then, the filter 113 is cleaned at the aforementioned position in association with an operation of conveying a recording medium when the picker 130 performs the operation of conveying a recording medium. The aforementioned configuration is advantageous in miniaturizing the library device 100 in the first direction, and in simplifying the operations relating to the accessor 120 and the picker 130.

In the aforementioned modified example, a cleaning operation may be performed when the accessor 120 and the picker 130 do not perform conveying of a recording medium.

Further, the cleaner 140 is mounted on the picker 130 in such a manner that a part of the cleaner 140 protrudes from the accessor 120 through the opening portion 122 formed in the main body unit 121 of the accessor 120. However, the accessor 120 may be configured such that the opening portion 122 is not formed in the main body unit 121. In such a configuration, substantially the same advantageous effects as described above can be obtained, as far as the cleaner 140 is mounted in such a manner as to protrude from the accessor 120, and the accessor 120 or the picker 130 is movable to a position capable of cleaning the filter 113 and the like.

Further, an exemplified configuration of the vent holes 112 and the filter 113 may be different from the aforementioned configuration. In the configuration, for instance, the cleaner 140 may be configured to directly clean the constituent element corresponding to the vent holes 112 according to the exemplary embodiment. Further alternatively, the cleaner 140 may be mounted on one of the surfaces of the accessor 120 or the picker 130 facing the vent holes. Any configuration is applicable, as far as the cleaner 140 is moved in response to the movement of the accessor 120 or the picker 130, and the vent holes 112 or the filter 113 is cleaned in response to the movement of the cleaner 140.

In many of the library devices using magnetic tapes, a cooling mechanism such as a fan for cooling the internal mechanism is provided. An opening for introducing the external air into the cooling mechanism is formed in the housing of the library devices.

When the external air is introduced through the opening, dust or dirt contained in the air may be simultaneously sucked. For this reason, a filter for blocking intrusion of dust or dirt may be disposed in the opening. However, when cleaning of the opening or the filter is not sufficiently performed, dust or dirt may be accumulated in the filter and the like, which may cause the clogging thereof. If the filter and the like are clogged, introduction of the external air into the cooling mechanism may be insufficient. As a result, the temperature inside the library device may increase.

None of the aforementioned Patent Literatures as mentioned above describes cleaning of an opening or a filter for introducing the external air in the library device. Therefore, it is difficult to prevent clogging of an opening or a filter for introducing the external air in the library device by the technique described in each of the aforementioned Patent Literatures.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, the configurations of the exemplary embodiments may be combined to each other, as far as such a combination does not depart from the scope of the present invention.

Further, it is noted that the inventor's intent is to retain all equivalents of the claimed invention even if the claims are amended during prosecution.

The invention claimed is:

1. A library device comprising:
   a magazine configured to accommodate a plurality of recording media;
   a drive configured to record or read information with respect to the recording media;
   a housing including vent holes formed on at least one surface of the housing, the housing being configured to accommodate the magazine and the drive;
   an accessor accommodated by the housing and comprising:
      a main body unit configured to convey a recording medium of the recording media in a first direction, the main body unit being attached to the housing of the library device to be movable in the first direction;
      a picker configured to convey the recording medium in a second direction intersecting with the first direction, the picker being mounted on the main body unit to be movable in the second direction; and
      a cleaner mounted on a surface of the picker along the second direction;
   a filter provided for the vent holes,
   wherein the accessor is disposed on the housing in such a manner that the cleaner comes into contact with the filter in response to the movement of the main body unit and the picker.

2. The library device according to claim 1, wherein the cleaner is provided in such a manner as to protrude to an outside of the main body unit.

3. The library device according to claim 2, wherein an opening is formed on a side surface of the main body unit, and the cleaner is mounted in such a manner as to protrude to the outside of the main body unit through the opening.

4. The library device according to claim 1, wherein the cleaner is a brush.

5. The library device according to claim 1, wherein the filter is provided along the second direction.

6. The library device according to claim 1, wherein the size of the filter is determined in accordance with at least one of a size of the cleaner or a moving range of the picker.

* * * * *